United States Patent
Yang et al.

(10) Patent No.: US 8,019,281 B2
(45) Date of Patent: Sep. 13, 2011

(54) TRANSMISSION METHOD AND TRANSMISSION SYSTEM

(75) Inventors: Wen-Hsin Yang, Hsinchu (TW); Yu-Chee Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 457 days.

(21) Appl. No.: 12/344,782

(22) Filed: Dec. 29, 2008

(65) Prior Publication Data

US 2009/0325492 A1    Dec. 31, 2009

(30) Foreign Application Priority Data

Jun. 25, 2008 (TW) ................................ 97123644 A

(51) Int. Cl.
*H04B 1/00* (2006.01)
*H04B 1/7073* (2006.01)
*H04J 3/06* (2006.01)

(52) U.S. Cl. .................... 455/41.2; 455/574; 455/575.2; 455/522; 375/130; 370/503

(58) Field of Classification Search ................ 455/41.2, 455/41.3, 41.1, 573, 574, 575.2; 370/350, 370/503; 375/149, 358
See application file for complete search history.

(56) References Cited

U.S. PATENT DOCUMENTS

| | | | |
|---|---|---|---|
| 6,067,297 A | 5/2000 | Beach | |
| 7,050,840 B2 | 5/2006 | Lin et al. | |
| 7,236,475 B2 | 6/2007 | Watanabe et al. | |
| 7,474,887 B2 * | 1/2009 | Chandra et al. | 455/343.2 |
| 7,903,601 B2 * | 3/2011 | Voglewede et al. | 370/324 |
| 7,929,912 B2 * | 4/2011 | Sherman | 455/41.2 |
| 2004/0097268 A1 | 5/2004 | Kurokawa et al. | |
| 2004/0192207 A1 * | 9/2004 | Ketola | 455/41.2 |
| 2006/0164969 A1 | 7/2006 | Malik et al. | |
| 2006/0285526 A1 | 12/2006 | Jang et al. | |
| 2007/0021155 A1 | 1/2007 | Yu et al. | |
| 2010/0124240 A1 * | 5/2010 | Lu et al. | 370/503 |
| 2011/0033017 A1 * | 2/2011 | Hwang et al. | 375/362 |

FOREIGN PATENT DOCUMENTS

| | | |
|---|---|---|
| TW | 515177 | 12/2002 |
| TW | 561391 | 11/2003 |
| TW | I273785 | 2/2004 |
| TW | 583578 | 4/2004 |
| TW | I245513 | 12/2005 |
| TW | I264206 | 10/2006 |
| TW | I283527 | 7/2007 |

OTHER PUBLICATIONS

English abstract of TW561391.
English abstract of TW515177.
English abstract of TWI273785.
English abstract of TW583578.

* cited by examiner

*Primary Examiner* — Howard Williams
(74) *Attorney, Agent, or Firm* — Thomas|Kayden

(57) ABSTRACT

A transmission method and a transmission system are provided. The transmission method is for communicating an electronic device and a wireless earphone. The wireless earphone has a normal mode and a sleep mode. The transmission method includes the following steps. If the wireless earphone works on the normal mode, then the wireless earphone continuously transmits the data of synchronization signals to the electronic device. If the wireless earphone works on the sleep mode, then the wireless earphone stops transmitting the data of synchronization signals to the electronic device, and simulates the data of synchronization signals.

14 Claims, 4 Drawing Sheets

TRANSMISSION METHOD AND TRANSMISSION SYSTEM

This application claims the benefit of Taiwan application Serial No. 97123644, filed Jun. 25, 2008, the subject matter of which is incorporated herein by reference.

BACKGROUND OF THE INVENTION

1. Field of the Invention

The invention relates in general to a transmission method and a transmission system, and more particularly to a transmission method adopting frequency hopping system and a transmission system.

2. Description of the Related Art

After the wireless earphone with wireless transmission function is combined with consumer electronic products, the wireless earphone must rely on the specific power saving mode to achieve efficient use of overall power supply.

A conventional wireless earphone, after entering power saving mode, still needs to keep some synchronization mechanisms working to assure whether to resume the normal mode. However, the operation of synchronization mechanism will incur additional power consumption. For example, when Bluetooth wireless transmission system is used in a cellular phone and a wireless earphone, the wireless earphone would still waste some power resource despite the wireless earphone is standby and Bluetooth protocol enters power saving mode. This is because the required time for switching to the normal mode tolerable when a call comes must be tolerable and the requirement of the frequency hopping synchronization between the mobile phone and the wireless earphone must be satisfied. Thus, the user is often bothered by replacing the battery for the wireless earphone.

SUMMARY OF THE INVENTION

The invention is directed to a transmission method and a transmission system. Due to the switch function of the trigger and the simulation function of the data of synchronization signals, power is saved and the normal mode is instantly resumed.

According to a first aspect of the present invention, a transmission method is provided. The transmission method is for communicating an electronic device and a wireless earphone. The wireless earphone has a normal mode and a sleep mode. The transmission method includes the following steps. (a) If the wireless earphone works on the normal mode, then the wireless earphone continuously transmits the data of synchronization signals to the electronic device. (b) If the wireless earphone works on the sleep mode, then the wireless earphone stops transmitting the data of synchronization signals to the electronic device, and simulates the data of synchronization signals.

According to a second aspect of the present invention, a transmission system is provided. The transmission system includes an electronic device and a wireless earphone. The electronic device includes a first wireless communication module. The wireless earphone has a normal mode and a sleep mode. The wireless earphone includes a second wireless communication module, an earphone processing unit and an earphone control unit. The second wireless communication module transmits the data of synchronization signals to the first wireless communication module. The earphone processing unit simulates the data of synchronization signals. When the wireless earphone works on the normal mode, the earphone control unit controls the second wireless communication module to transmit the data of synchronization signals. When the wireless earphone works on the sleep mode, the earphone control unit controls the second wireless communication module to stop transmitting the data of synchronization signals, and controls the earphone processing unit to simulate the data of synchronization signals.

The invention will become apparent from the following detailed description of the preferred but non-limiting embodiments. The following description is made with reference to the accompanying drawings.

DETAILED DESCRIPTION OF THE INVENTION

Figure 1:
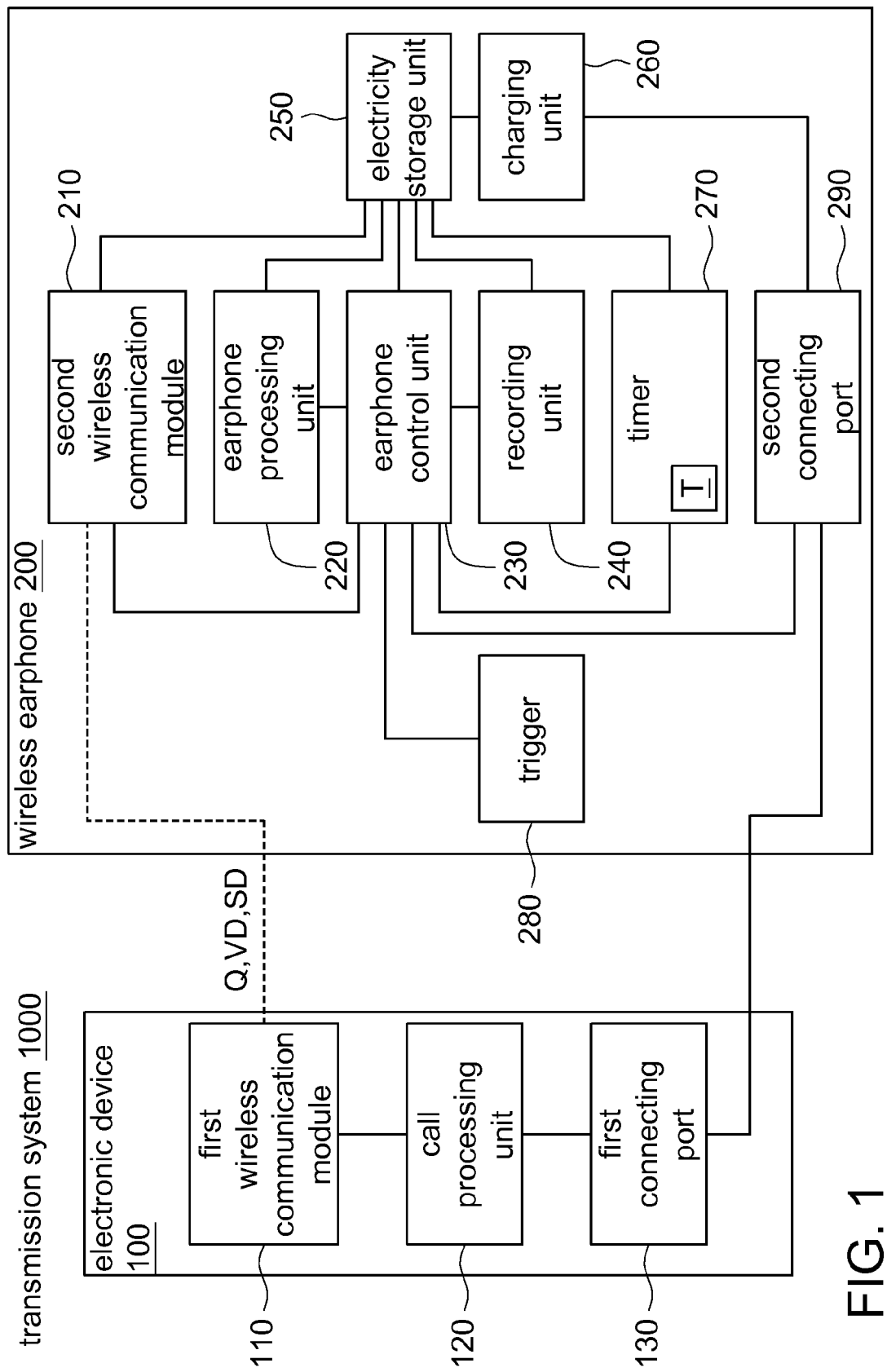
FIG. 1 shows a transmission system of a first embodiment of the invention.

Referring to FIG. 1, a transmission system 1000 of a first embodiment of the invention is shown. The transmission system 1000 includes an electronic device 100 and a wireless earphone 200. The electronic device 100 includes a first wireless communication module 110, a call processing unit 120 and a first connecting port 130. The electronic device 100, for example, is a mobile phone, a personal digital assistant (PDA) or a notebook computer. The wireless earphone 200, for example, is a Bluetooth wireless earphone or a micro-wave communication earphone. In the present embodiment of the invention, the electronic device 100 is exemplified by a mobile phone, and the wireless earphone 200 is exemplified by a Bluetooth wireless earphone.

The wireless earphone 200 includes a second wireless communication module 210, an earphone processing unit 220, an earphone control unit 230, a recording unit 240, an electricity storage unit 250, a charging unit 260, a timer 270, a trigger 280 and a second connecting port 290. Various signals are transmitted between the first wireless communication module 110 and the second wireless communication module 210. Examples of the various signals include, a voice data VD for making a call, a data of synchronization signals SD required by Bluetooth protocol or a call request Q transmitted to the wireless earphone 200 by the electronic device 100. The earphone processing unit 220 simulates the data of synchronization signals SD. The electricity storage unit 250 used for storing power is a nickel-metal hydride (Ni—H) charging battery, a Li-ion (Li) charging battery or a nickel-cadmium (Ni—Cd) charging battery for example. The second connecting port 290 is for electrically connecting the first connecting port 130 of the electronic device 100. Signals and power are transmitted between the first connecting port 130 and the second connecting port 290. The charging unit 260 then transmits the power of the electronic device 100 via the second connecting port 290 to the electricity storage unit 250 to charge the electricity storage unit 250. The timer 270 calculates the accumulated time T of various modes of the wireless earphone 200. The trigger 280, being a two-stage push-push switch, switches between "ON" and "OFF". The trigger 280 automatically switches to "ON" when the wireless earphone 200 is hanged on the electronic device 100, and automatically switches to "OFF" when the wireless earphone 200 is separated from the electronic device 100.

Figure 2:
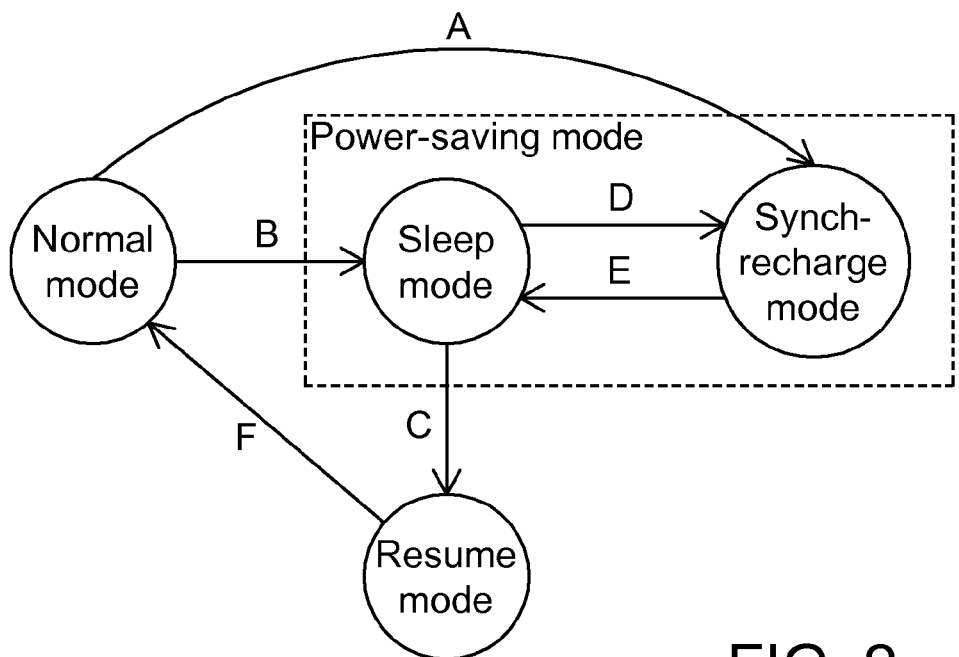
FIG. 2 shows various modes of a wireless earphone of an embodiment of the invention.

Referring to FIG. 2, various modes of a wireless earphone 200 of an embodiment of the invention are shown. The wireless earphone 200 of the present embodiment of the invention has a normal mode, a sleep mode, a synch-recharge mode and a resume mode. The wireless earphone 200 switches among the above various modes. The sleep mode and the synch-recharge mode achieve power saving and fast resuming through the operation of the present embodiment of the invention. Therefore, the sleep mode and the synch-recharge mode both belong to power saving mode. Referring to Table 1, the wireless earphone 200 working on the normal mode, the sleep mode and the synch-recharge mode is shown.

TABLE 1

|  | Normal Mode | Sleep Mode | Synch-Recharge Mode |
|---|---|---|---|
| Engaged in a voice call? | Y | N | N |
| Is the wireless earphone hanged on the electronic device? | N | Y | Y |
| Is the trigger activated? | N | N | Y |
| Is wireless transmission activated? | Y | N | N |
| Is cabled transmission activated? | N | N | Y |
| Is the data of synchronization signals continuously transmitted? | Y | N | N |
| Is the data of synchronization signals simulated? | N | Y | N |
| Is the earphone processing unit activated? | Y | Y | N |
| Charged? | N | N | Y |

When the wireless earphone 200 works on the normal mode, the electronic device 100 and the wireless earphone 200 are engaged in a voice call. Meanwhile, the wireless earphone 200 continuously transmits the data of synchronization signals SD to the electronic device 100, such that a Bluetooth protocol is established between the wireless earphone 200 and the electronic device 100. The wireless earphone 200 continuously transmits the voice data VD for the electronic device 100 to continue the voice call. Regardless the wireless earphone 200 is hanged on the electronic device 100 or not, the wireless earphone 200 is at the normal mode as long as both the wireless earphone 200 and the electronic device 100 are engaged in a voice call.

When the wireless earphone 200 works on the sleep mode, the voice call between the electronic device 100 and the wireless earphone 200 is over and the wireless earphone 200 waits for the next voice call. Meanwhile, the earphone control unit 230 controls the second wireless communication module 210 to stop transmitting the data of synchronization signals SD, and controls the earphone processing unit 220 to simulate the data of synchronization signals SD.

When the wireless earphone 200 works on the synch-recharge mode, the wireless earphone 200 is hanged on the electronic device 100, and cabled electrical connected is established between the wireless earphone 200 and the electronic device 100. Meanwhile, the earphone control unit 230 controls the second wireless communication module 210 to stop transmitting the data of synchronization signals SD, and turns off the earphone processing unit 220, such that the earphone processing unit 220 stops simulating the data of synchronization signals SD. At the same time, the earphone control unit 230 further controls the recording unit 240 to record the recently transmitted data of synchronization signals SD or the recently simulated data of synchronization signals SD. As the wireless earphone 200 is already hanged on the electronic device 100, the first connecting port 130 and the second connecting port 290 are electrically connected. Meanwhile, the charging unit 260 further transmits the power of the electronic device 100 to the electricity storage unit 250 via the second connecting port 290 to charge the electricity storage unit 250.

The power required for "simulating" the data of synchronization signals SD is far smaller than the power required for "continuously transmitting" the data of synchronization signals SD. Thus, when the wireless earphone 200 of the present embodiment of the invention works on the sleep mode, the power can be saved.

When the electronic device 100 transmits a call request Q to the wireless earphone 200, the wireless earphone 200 can instantly establish a Bluetooth protocol by using the simulated data of synchronization signals SD, such that the delay for answering a call is reduced.

Thus, when the wireless earphone 200 of the present embodiment of the invention, the wireless earphone 200 not only saves power but also enables a call to be answered instantly when working on the sleep mode.

Moreover, when the wireless earphone 200 of the present embodiment of the invention works on the synch-recharge mode, the wireless earphone 200 not only stops transmitting the data of synchronization signals SD but further stops simulating the data of synchronization signals SD. Thus, when the wireless earphone 200 of the present embodiment of the invention works on the synch-recharge mode, more power is saved. Particularly, the charging unit 260 further charges the electricity storage unit 250 to assure that the wireless earphone 200 has sufficient power.

A flowchart is disclosed below to elaborate how the wireless earphone 200 of the present embodiment of the invention is switched among various modes. Also, referring to FIG. 2 and FIGS. 3A~3D. FIGS. 3A~3D show the flowchart of a method of switching a wireless earphone 200 switching among various modes.

FIGS. 3A~3D show how the wireless earphone 200 switches among the normal mode, the sleep mode, the synch-recharge mode and the resume mode. Any mode can be used as a starting point of the process. In the following disclosure, the normal mode is used as a starting point.

Figure 3A:
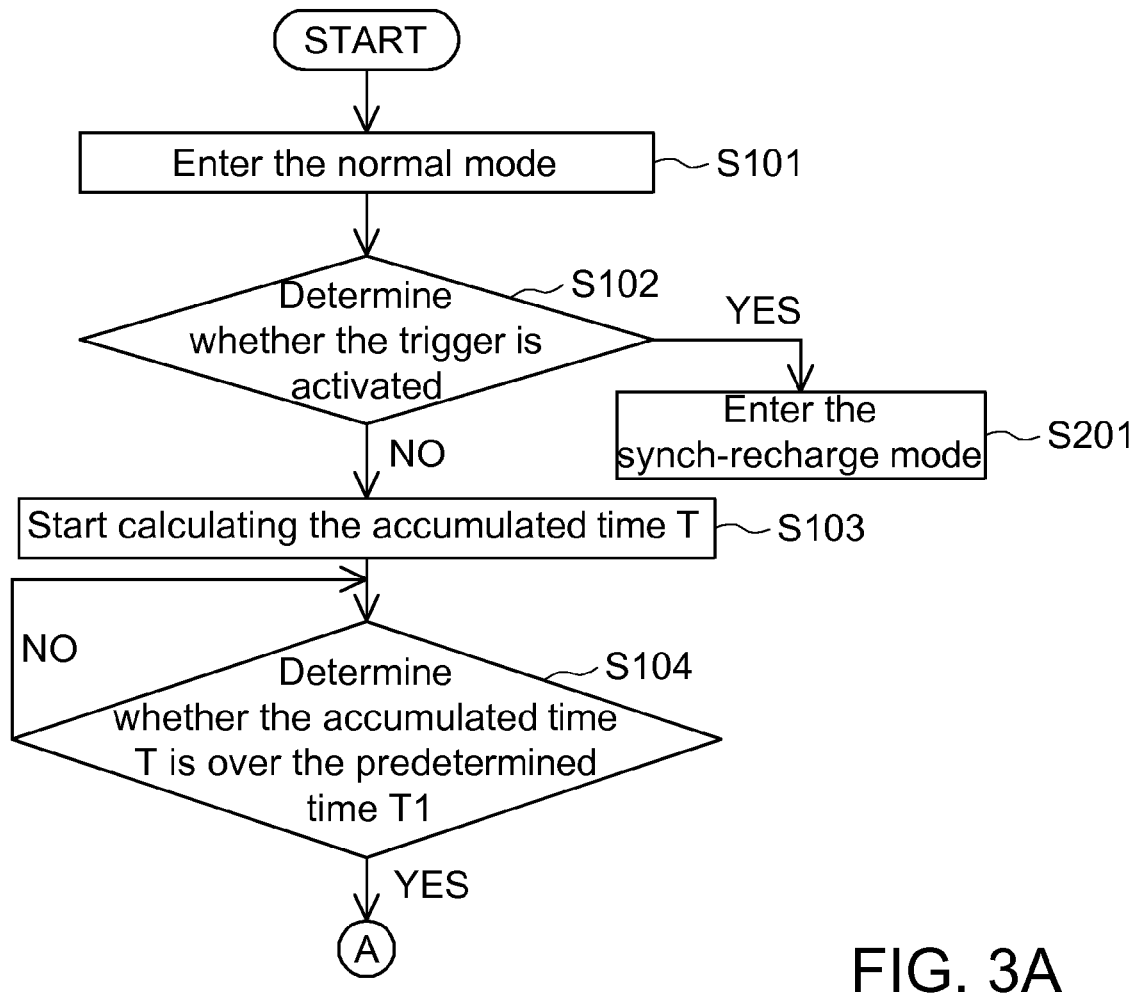
FIGS. 3A~3D show the flowchart of a method of switching a wireless earphone switching among various modes according to an embodiment of the invention.

Firstly, as indicated in FIG. 3A, the method begins at step S101, the wireless earphone 200 enters the normal mode. Meanwhile, the electronic device 100 and the wireless earphone 200 are engaged in a voice call until the call finishes.

Next, the method proceeds to step S102, the earphone control unit 230 determines whether the trigger 280 is activated. If the trigger 280 is activated, then the method proceeds to S201; otherwise, the method proceeds to S103.

In step S201, the trigger 280 is activated. This implies that the wireless earphone 200 is hanged on the electronic device 100, so the earphone control unit 230 immediately controls the wireless earphone 200 to enter the synch-recharge mode (as indicated in the path A of FIG. 2).

In step S103, the earphone control unit 230 activates the timer 270 to start calculating the accumulated time T.

Next, the method proceeds to step S104, the earphone control unit 230 further determines whether the accumulated time T is over the predetermined time T1. If the accumulated time T is not over the predetermined time T1, then step S104 is repeated; otherwise, the method proceeds to S301 (illustrated in FIG. 3B).

Figure 3B:
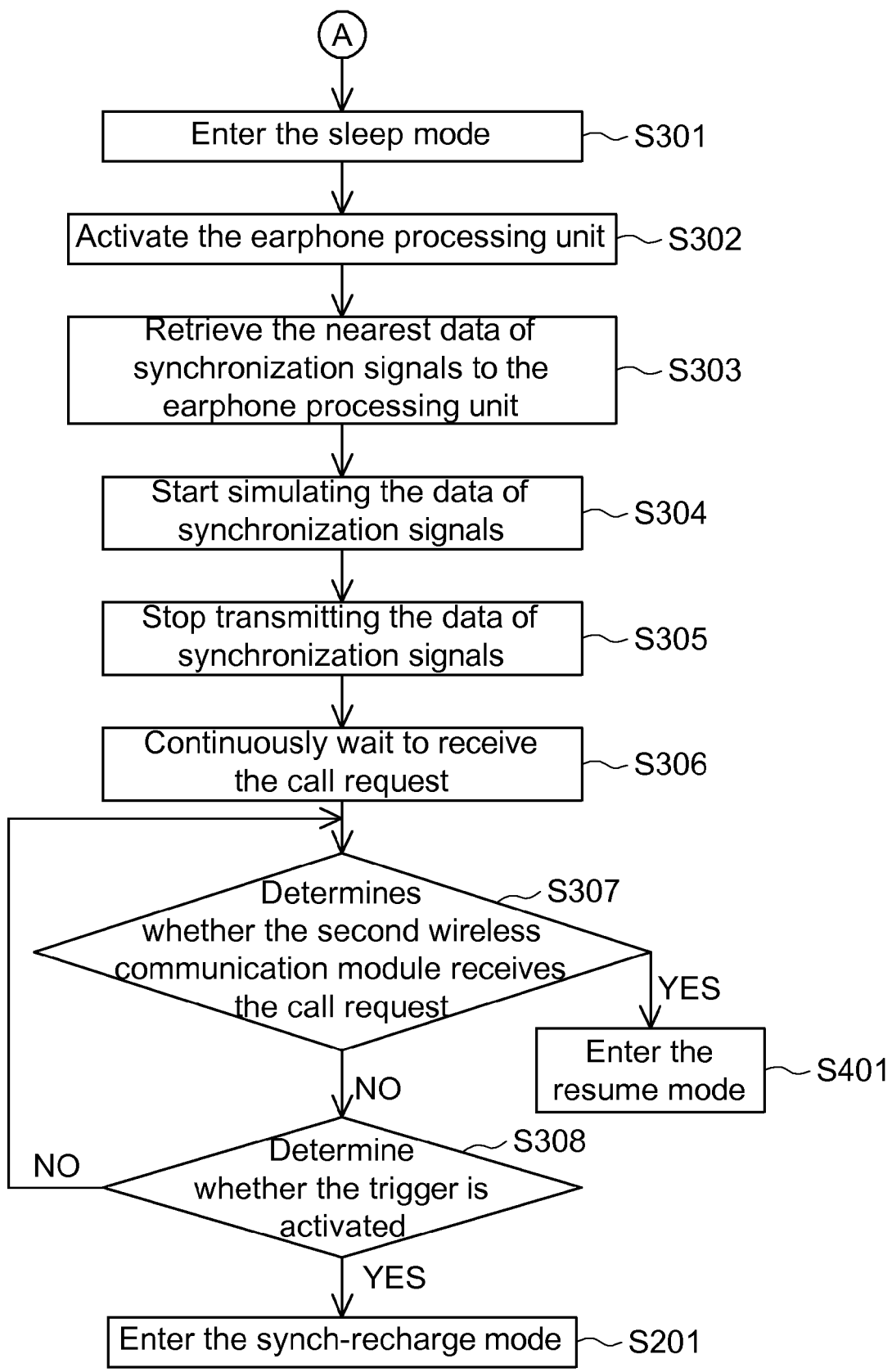

Then, as indicated in FIG. 3B, the method proceeds to step S301, the accumulated time T is over the predetermined time T1, so the earphone control unit 230 controls the wireless earphone 200 to enter the sleep mode (as indicated in the path B of FIG. 2).

Next, the method proceeds to step S302, the earphone control unit 230 activates the earphone processing unit 220.

Then, the method proceeds to step S303, the earphone control unit 230 retrieves the nearest data of synchronization signals SD to the earphone processing unit 220.

Next, the method proceeds to step S304, the earphone control unit 230 controls the earphone processing unit 220 to start simulating the data of synchronization signals SD.

Then, the method proceeds to step S305, the earphone control unit 230 stops partial functions of the second wireless communication module 210, such that the second wireless communication module 210 stops transmitting the data of synchronization signals SD to the outside and only receives the signal such as the call request Q.

Next, the method proceeds to step S306, the earphone control unit 230 controls the second wireless communication module 210 to continuously wait for receiving the call request Q coming from the electronic device 110.

Then, the method proceeds to step S307, the earphone control unit 230 determines whether the second wireless communication module 210 receives the call request Q. If the second communication module 210 receives the call request Q, then the method proceeds to S401; otherwise, the method proceeds to S308.

In step S401, the second communication module 210 already receives the call request Q, so the earphone control unit 230 controls the wireless earphone 200 to enter the resume mode (as indicated in the path C of FIG. 2).

In step S308, the earphone control unit 230 determines whether the trigger 280 is activated. If the trigger 280 is activated, then the method proceeds to S201; otherwise, the method returns to step S307.

In step S201, the trigger 280 is activated. This implies that the wireless earphone 200 is hanged on the electronic device 100, so the earphone control unit 230 immediately controls the wireless earphone 200 to enter the synch-recharge mode (as indicated in the path D of FIG. 2).

As indicated in FIG. 3A and FIG. 3B, after step S102 or step S308 is executed, if the trigger 280 is activated, the method proceeds to S201 (as indicated in the path A and the path D of FIG. 2). The steps performed after the step S201 are described in FIG. 3C.

Figure 3C:
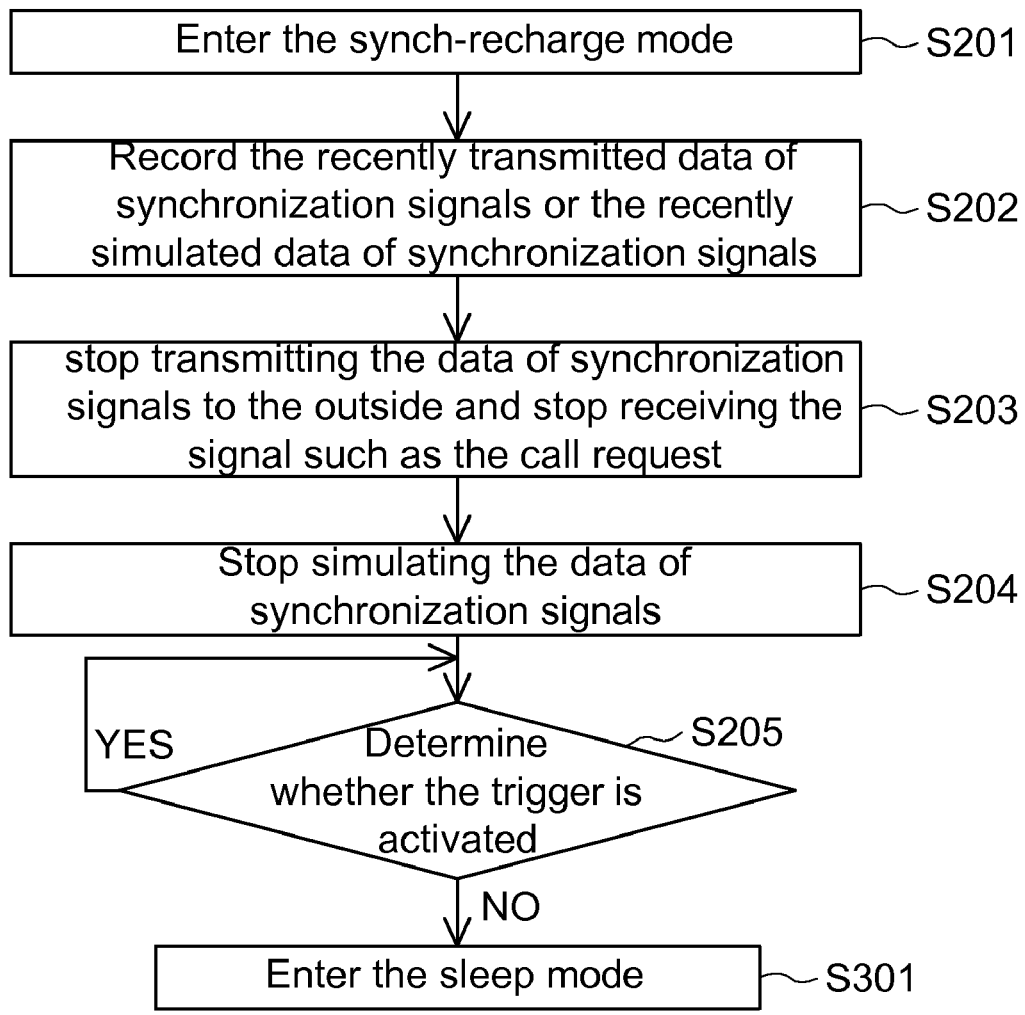

As indicated in FIG. 3C, firstly, the method begins at step S201, the trigger 280 is activated, so the earphone control unit 230 controls the wireless earphone 200 to enter the synch-recharge mode.

Next, the method proceeds to step S202, the earphone control unit 230 controls the recording unit 240 to record the recently transmitted data of synchronization signals SD or the recently simulated data of synchronization signals SD.

Then, the method proceeds to step S203, the earphone control unit 230 stops the function of the second wireless communication module 210, such that the second communication module 210 stops transmitting the data of synchronization signals SD to the outside and stops receiving the signal such as the call request Q.

Then, the method proceeds to step S204, the earphone control unit 230 turns off the earphone processing unit 220, such that the earphone processing unit 220 stops simulating the data of synchronization signals SD.

Next, the method proceeds to step S205, the earphone control unit 230 determines whether the trigger 280 is activated. If the trigger 280 is activated, then the method returns to step S205; otherwise, the method proceeds to S301.

In step S301, the trigger 280 changes to OFF status from the ON status. This implies that the wireless earphone 200 is already leaved the electronic device 100, so the earphone control unit 230 controls the wireless earphone 200 to resume the sleep mode (as indicated in the path E of FIG. 2).

As indicated in FIG. 3B, after step S307 is executed, if the second communication module 210 receives the call request Q, then the method proceeds to S401. The steps performed after the step S401 are described in FIG. 3D.

Figure 3D:
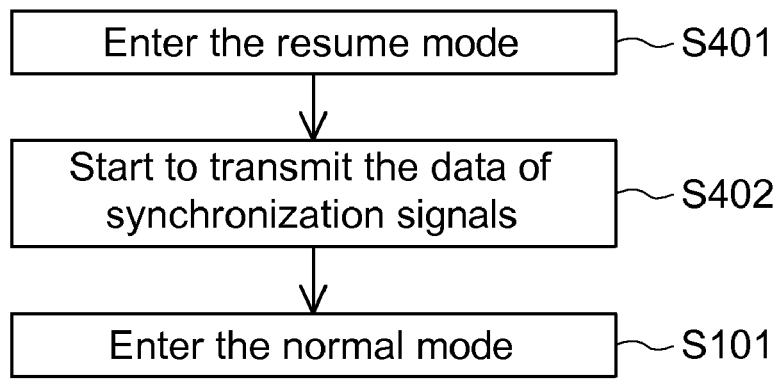

As indicated in FIG. 3D, firstly, the method begins at step S401, the second communication module 210 already receives the call request Q, so the earphone control unit 230 controls the wireless earphone 200 to enter the resume mode (as indicated in the path C of FIG. 2).

Next, the method proceeds to step S402, the earphone control unit 230 activates the function of the second wireless communication module 210, such that the second communication module 210 starts to transmit the data of synchronization signals SD to the outside according to the recently transmitted data of synchronization signals SD or the recently simulated data of synchronization signals SD.

Then, in step S101, the earphone control unit 230 controls the wireless earphone 200 to restore the normal mode (as indicated in the path F of FIG. 2).

According to the above process, the wireless earphone 200 switches among the normal mode, the sleep mode, the synch-recharge mode and the resume mode.

The transmission method and the transmission system disclosed in the above embodiments of the invention have many advantages exemplified below.

Firstly, the power required for "simulating" the data of synchronization signals is far smaller than the power required for "continuously transmitting" the data of synchronization signals. Thus, when the wireless earphone of the present embodiment of the invention works on the sleep mode, the power can be saved Secondly, when the electronic device transmits a call request to the wireless earphone, the wireless earphone can instantly establish a Bluetooth protocol by using the simulated data of synchronization signals, such that the delay for answering a call is reduced.

Thirdly, when the wireless earphone works on the synch-recharge mode, the wireless earphone not only stops transmitting the data of synchronization signals, but further stops simulating the data of synchronization signals. Thus, the wireless earphone of the present embodiment of the invention can save more power when working on the synch-recharge mode.

Fourthly, when the wireless earphone works on the synch-recharge mode, the charging unit further charges the electricity storage unit, further assuring that the wireless earphone has sufficient power.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmission method for communicating an electronic device and a wireless earphone, wherein the wireless earphone has a normal mode and a sleep mode, and the transmission method comprises the following steps:

(a) continuously transmitting a data of synchronization signals to the electronic device by the wireless earphone if the wireless earphone works on the normal mode; and (b) stopping transmitting the data of synchronization signals to the electronic device, and simulating the data of synchronization signals by the wireless earphone if the wireless earphone works on the sleep mode.

2. The transmission method according to claim 1, wherein the wireless earphone further has a synch-recharge mode, the transmission method further comprises:

(c) stopping transmitting the data of synchronization signals to the electronic device, stopping simulating the data of synchronization signals, and recording the recently transmitted data of synchronization signals or the recently simulated data of synchronization signals by the wireless earphone if the wireless earphone works on the synch-recharge mode.

3. The transmission method according to claim 2, wherein in the step (c), the wireless earphone is charged via the electronic device.

4. The transmission method according to claim 1, wherein the wireless earphone is a Bluetooth wireless earphone.

5. The transmission method according to claim 1, wherein the wireless earphone further comprises a trigger and the transmission method further comprises:

(d) enabling the wireless earphone to enter the sleep mode if the wireless earphone has left the normal mode for a predetermined time and is electrically isolated from the electronic device; and (e) enabling the wireless earphone to enter the sleep mode if the wireless earphone leaves the normal mode and is electrically isolated from the electronic device, and the trigger is activated.

6. The transmission method according to claim 5, further comprising:

(f) enabling the wireless earphone to enter the synch-recharge mode if the wireless earphone leaves the normal mode and is electrically connected with the electronic device; and (g) enabling the wireless earphone to enter the synch-recharge mode if the wireless earphone leaves the sleep mode and is electrically connected with the electronic device.

7. The transmission method according to claim 6, further comprising:

(h) enabling the wireless earphone to enter the normal mode if the electronic device transmits a call request to the wireless earphone.

8. A transmission system, comprising:
an electronic device, comprising:
  a first wireless communication module; and
a wireless earphone having a normal mode and a sleep mode, wherein the wireless earphone comprises:
  a second wireless communication module for transmitting a data of synchronization signals to the first wireless communication module;
  an earphone processing unit for simulating the data of synchronization signals; and
  an earphone control unit;

wherein when the wireless earphone works on the normal mode, the earphone control unit controls the second wireless communication module to transmit the data of synchronization signals;

when the wireless earphone works on the sleep mode, the earphone control unit controls the second wireless communication module stops transmitting the data of synchronization signals, and controls the earphone processing unit to simulate the data of synchronization signals.

9. The transmission system according to claim 8, wherein the wireless earphone further has a synch-recharge mode, and the wireless earphone further comprises:

a recording unit, wherein when the wireless earphone works on the synch-recharge mode, the earphone control unit controls the second wireless communication module to stop transmitting the data of synchronization signals, and controls the earphone processing unit to stop simulating the data of synchronization signals, and controls the recording unit to record the recently transmitted data of synchronization signals or the recently simulated data of synchronization signals.

10. The transmission system according to claim 9, wherein the wireless earphone further comprises:

an electricity storage unit; and a charging unit electrically connected with the electronic device, wherein when the wireless earphone works on the synch-recharge mode, the earphone control unit further controls the charging unit to charge the electricity storage unit.

11. The transmission system according to claim 8, wherein the wireless earphone is a Bluetooth wireless earphone.

12. The transmission system according to claim 8, wherein the wireless earphone further comprises:

a timer used for calculating an accumulated time for which the wireless earphone has left the normal mode, wherein the earphone control unit controls the wireless earphone to enter the sleep mode if the accumulated time is larger than a predetermined time, and the charging unit is electrically isolated from the electronic device; and a trigger, wherein the earphone control unit controls the wireless earphone to enter the sleep mode if the wireless earphone leaves the normal mode and is electrically isolated from the electronic device, and the trigger is activated.

13. The transmission system according to claim 12, wherein the earphone control unit controls the wireless earphone to enter the synch-recharge mode if the wireless earphone leaves the normal mode and is electrically connected with the electronic device; and the earphone control unit controls the wireless earphone to enter the synch-recharge mode if the wireless earphone leaves the sleep mode and is electrically connected with the electronic device.

14. The transmission system according to claim 13, wherein the earphone control unit controls the wireless earphone to enter the normal mode if the first wireless communication module transmits a call request to the second wireless communication module.

* * * * *